United States Patent [19]
DeFour

[11] 3,759,114
[45] Sept. 18, 1973

[54] DOUBLE-LEVER BRAKE CONTROL FOR BICYCLES

[75] Inventor: Jean-Marie DeFour, Vertes Feuilles, France

[73] Assignee: Angenieux-CIB S.A., Saint-Etienne, France

[22] Filed: Jan. 7, 1972

[21] Appl. No.: 216,107

[30] Foreign Application Priority Data
Jan. 29, 1971 France .............................. 7103673

[52] U.S. Cl. ................................................ 74/489
[51] Int. Cl. ............................................ G05g 11/00
[58] Field of Search ...................... 74/489, 490, 523, 74/479, 480

[56] References Cited
UNITED STATES PATENTS
| | | | |
|---|---|---|---|
| 3,596,530 | 8/1971 | Yoshigai | 74/489 |
| 1,319,627 | 10/1919 | Sentinella | 74/484 |
| 2,311,208 | 2/1943 | Campbell | 74/479 |
| 3,403,577 | 10/1968 | Ozaki | 74/480 |

FOREIGN PATENTS OR APPLICATIONS
| | | | |
|---|---|---|---|
| 352,334 | 7/1931 | Great Britain | 74/489 |
| 456,658 | 4/1950 | Italy | 74/489 |

*Primary Examiner*—Charles J. Myhre
*Assistant Examiner*—R. H. Lazarus
*Attorney*—Eric H. Waters et al.

[57] ABSTRACT

In this dual control of bicycle brakes the main or racing lever and the auxiliary or sports lever are rigidly interconnected through a common fulcrum pin. The main lever and the auxiliary lever each comprise, in the portion connected to the brake lever fulcrum bracket, a polygonal hole or eye adapted to receive therethrough a fulcrum pin having a matching cross-sectional polygonal contour, so that the levers and pin are rotatably rigid with one another, rings also formed with a corresponding polygonal hole being adapted to be fitted on the fulcrum pin and having a cylindrical outer peripheral contour such that the fulcrum pin is pivotally mounted therethrough in a bearing provided to this end in the brake lever fulcrum bracket.

4 Claims, 5 Drawing Figures

Patented Sept. 18, 1973
3,759,114
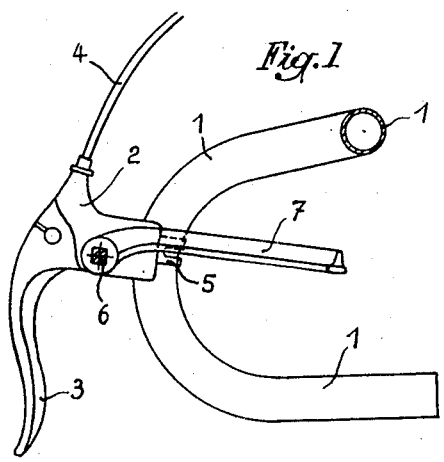
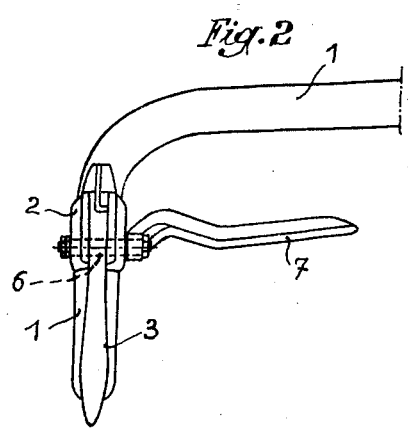
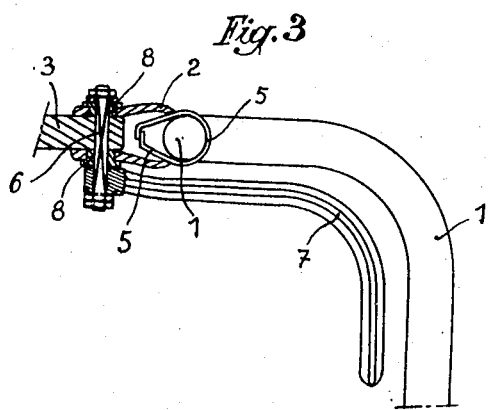
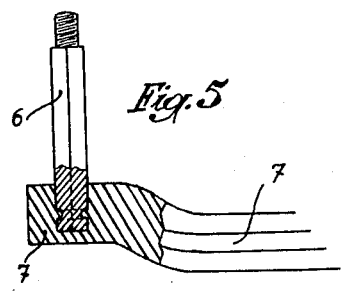
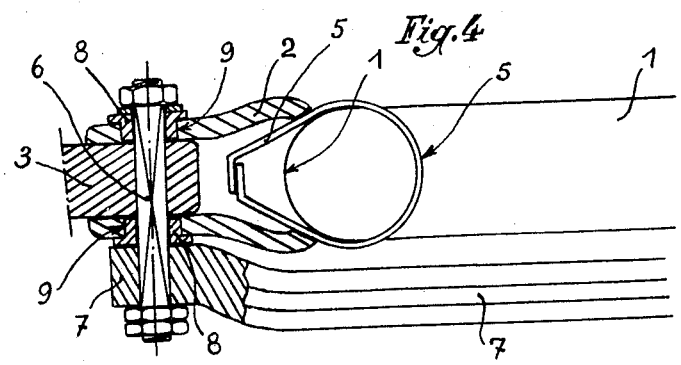
INVENTOR.
BY

DOUBLE-LEVER BRAKE CONTROL FOR BICYCLES

FIELD OF THE INVENTION

The present invention relates to bicycle brakes and has specific reference to an improved double-lever control system therefor.

The shape of handlebars and more particularly of racing type handlebars is such that the brake lever fulcrum brackets and their control levers must compulsorily be clamped to the curved, forward-projecting portions of the handlebar; under these conditions, the cyclist must assume a stooped or "racing" position for applying the brakes.

Now when the cyclist resumes an erect position it may still become necessary to apply the brakes from the position thus occupied by his hand on the top sections of the handlebar. To this end, dual control brake levers comprising an auxiliary lever adapted to be actuated from this upper position have been created.

According to a known and typical arrangement this auxiliary lever is pivotably connected to the brake lever fulcrum bracket and comprises, beyond its fulcrum pin, an extension terminating with a bent stud engaged between the abutment portion of said bracket and the base of the racing lever, so that when said auxiliary lever is actuated, the lever action produced by said stud actuates in turn the racing lever so that the latter is operated as if it were actuated directly by the cyclist's hand.

The present invention is concerned with a different assembly free of any intermediate lever action or member.

According to this invention, the main or racing lever and the auxiliary or sports lever are rigidly interconnected through a common fulcrum pin.

According to a preferred but not exclusive embodiment of the present invention, said main lever and said auxiliary lever each comprise, in the portion connected to the brake lever fulcrum bracket, a polygonal hole or eye adapted to receive therethrough a fulcrum pin having a matching cross-sectional polygonal contour, so that said levers and pin are rotatably rigid with one another, rings also formed with a corresponding polygonal hole being adapted on be fitted to said fulcrum pin and having a cylindrical outer peripheral contour such that said fulcrum pin is pivotally mounted therethrough in bearings means provided to this end in the brake lever fulcrum bracket.

BRIEF DESCRIPTION OF THE DRAWING

FIG. 1 is a side elevational view of a handlebar to which the dual control system of this invention for a bicycle brake is fitted, the top portion of the handlebar and the fulcrum pin being shown in cross-section;

FIG. 2 is a front view of the double-lever control of FIG. 1;

FIG. 3 is a plan and part-sectional view of the same assembly;

FIG. 4 illustrates on a larger scale a detail view similar to that of FIG. 3, and FIG. 5 illustrates a modified detail of the auxiliary lever and fulcrum pin assembly.

DESCRIPTION OF THE PREFERRED EMBODIMENT

In the various Figures of the drawings, reference numeral 1 designates the handlebar, in this case a racing handlebar, 2 is the brake lever fulcrum bracket, 3 is the main control lever, 4 the Bowden cable and sheath assembly for transmitting the braking effort from the control to the brake proper, and 5 is the half clip for fixing the brake control to the handlebar.

In the typical embodiment illustrated in the drawings, the eye or hole formed at the fulcrum end of the main lever 3 has a square contour and is closely fit on a pivot or fulcrum pin 6 having the same square cross-section.

Also fitted to this fulcrum pin 6 are on the one hand the pivoted end of an auxiliary lever 7 bent to a suitable configuration and on the other hand a pair of bushings or rings 8, made for example of suitable plastic material and, journalled for free rotation in cylindrical holes 9 formed in wings of the fulcrum bracket 2.

Thus, the two levers 3 and 7 are rigidly interconnected through fulcrum pin 6 so that the brake is actuated directly, whether the cyclist operates one or the other of the control levers.

The fulcrum pin 6 may also have one end embedded by a molding operation in the auxiliary lever 7, as shown in FIG. 5.

Of course, and as already explained in the foregoing, this invention should not be construed as being strictily limited to the single form of embodiment and modified detail described and illustrated herein, since various modifications may be conceived without departing from the basic principles of the invention as set forth in the appended claims.

What is claimed as new is:

1. Brake control apparatus for a bicycle having a handbrake, said brake control apparatus comprising a bracket secured to the handlebar of the bicycle, first and second separate levers of different shape for effecting brake control, an axle having a polygonal cross-section, said first and second levers having respective holes corresponding in shape to that of the polygonal cross-section of the axle, said first and second levers being closely fitted on said axle by means of said holes so as to be coupled therewith in rotation, and rings having holes of the same shape as the cross-section of the axle and receiving the axle for common rotation therewith, said rings having cylindrical outer surfaces rotatably mounted in said bracket and serving as bearings for said axle in the bracket.

2. Brake control apparatus as claimed in claim 1 wherein said bracket comprises spaced arms between which one of said levers is engaged, each of said rings being rotatably mounted in a respective arm.

3. Brake control apparatus as claimed in claim 2 wherein the other of said levers is mounted on said axle outside the bracket and adjacent one of the arms thereof, and means axially securing the axle within the levers and rings.

4. Brake control apparatus as claimed in claim 1 wherein the rings are made of a plastic material.

* * * * *